United States Patent
Lewis et al.

(10) Patent No.: US 11,709,742 B2
(45) Date of Patent: *Jul. 25, 2023

(54) METHOD FOR MIGRATING CPU STATE FROM AN INOPERABLE CORE TO A SPARE CORE

(71) Applicant: Oracle International Corporation, Redwood Shores, CA (US)

(72) Inventors: James Lewis, San Jose, CA (US); Paul Jordan, Austin, TX (US); Gregory Onufer, Palo Alto, CA (US); Ali Vahidsafa, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/648,443

(22) Filed: Feb. 2, 2022

(65) Prior Publication Data

US 2022/0156075 A1    May 19, 2022

Related U.S. Application Data

(63) Continuation of application No. 16/735,564, filed on Jan. 6, 2020, now Pat. No. 11,263,012, which is a (Continued)

(51) Int. Cl.
*G06F 11/00* (2006.01)
*G06F 11/20* (2006.01)
(Continued)

(52) U.S. Cl.
CPC ........ *G06F 11/2028* (2013.01); *G06F 3/0617* (2013.01); *G06F 3/0647* (2013.01);
(Continued)

(58) Field of Classification Search
None
See application file for complete search history.

(56) References Cited

U.S. PATENT DOCUMENTS

| | | |
|---|---|---|
| 6,199,179 B1 | 3/2001 | Kauffman |
| 6,260,068 B1 | 7/2001 | Zalewski |
| | (Continued) | |

FOREIGN PATENT DOCUMENTS

EP    0917056    1/2008

OTHER PUBLICATIONS

Google Scholar/Patents search—text refined (Year: 2022).*
(Continued)

*Primary Examiner* — Christopher S McCarthy
(74) *Attorney, Agent, or Firm* — Kowert, Hood, Munyon, Rankin & Goetzel, P.C.; Scott W. Pape; Dean M. Munyon

(57) ABSTRACT

An apparatus is disclosed in which the apparatus may include a plurality of cores, including a first core, a second core and a third core, and circuitry coupled to the first core. The first core may be configured to process a plurality of instructions. The circuitry may be may be configured to detect that the first core stopped committing a subset of the plurality of instructions, and to send an indication to the second core that the first core stopped committing the subset. The second core may be configured to disable the first core from further processing instructions of the subset responsive to receiving the indication, and to copy data from the first core to a third core responsive to disabling the first core. The third core may be configured to resume processing the subset dependent upon the data.

20 Claims, 9 Drawing Sheets

Related U.S. Application Data continuation of application No. 15/632,567, filed on Jun. 26, 2017, now Pat. No. 10,528,351, which is a continuation of application No. 14/549,742, filed on Nov. 21, 2014, now Pat. No. 9,710,273.

(51) Int. Cl.
  *G06F 9/30* (2018.01)
  *G06F 12/0875* (2016.01)
  *G06F 12/0815* (2016.01)
  *G06F 12/1027* (2016.01)
  *G06F 9/38* (2018.01)
  *G06F 9/48* (2006.01)
  *G06F 3/06* (2006.01)

(52) U.S. Cl.
  CPC ........ *G06F 3/0683* (2013.01); *G06F 9/30145* (2013.01); *G06F 9/3851* (2013.01); *G06F 9/3861* (2013.01); *G06F 9/485* (2013.01); *G06F 12/0815* (2013.01); *G06F 12/0875* (2013.01); *G06F 12/1027* (2013.01); *G06F 2201/805* (2013.01); *G06F 2212/452* (2013.01); *Y02D 10/00* (2018.01)

(56) References Cited

U.S. PATENT DOCUMENTS

| | | |
|---|---|---|
| 7,665,005 B2 | 2/2010 | Szydlowski |
| 8,127,181 B1 | 2/2012 | Shebanow et al. |
| 8,239,863 B2 | 8/2012 | Bhat |
| 8,412,981 B2 | 4/2013 | Munoz et al. |
| 8,752,060 B2 | 6/2014 | Hsieh |
| 8,972,707 B2 | 3/2015 | Henry |
| 11,263,012 B2 * | 3/2022 | Lewis ................ G06F 12/0815 |
| 2003/0115500 A1 | 6/2003 | Akrout |
| 2003/0217088 A1 | 11/2003 | Takamoto |
| 2005/0223359 A1 | 10/2005 | Rao Nagaraju et al. |
| 2005/0240806 A1 | 10/2005 | Bruckert |
| 2006/0212677 A1 | 9/2006 | Fossum |
| 2006/0242456 A1 | 10/2006 | Kondo |
| 2006/0259831 A1 | 11/2006 | Sohm et al. |
| 2008/0163255 A1 | 7/2008 | Munoz et al. |
| 2009/0138670 A1 | 5/2009 | Mutlu |
| 2010/0049268 A1 | 2/2010 | Martins |
| 2010/0325485 A1 | 12/2010 | Kamath |
| 2012/0089984 A1 * | 4/2012 | Adar .................. G06F 9/4812 710/263 |
| 2012/0159235 A1 | 6/2012 | Suganthi et al. |
| 2012/0166777 A1 | 6/2012 | Mclellan et al. |
| 2012/0290806 A1 | 11/2012 | Moyer |
| 2013/0132708 A1 | 5/2013 | Kurihara et al. |
| 2014/0082409 A1 | 3/2014 | Bae |
| 2014/0089734 A1 | 3/2014 | Busaba et al. |
| 2014/0208329 A1 | 7/2014 | Abali |
| 2016/0147545 A1 | 5/2016 | Jain |
| 2017/0062075 A1 | 3/2017 | Barber et al. |
| 2018/0150359 A1 | 5/2018 | Yamamoto |
| 2018/0365022 A1 | 12/2018 | Varma et al. |

OTHER PUBLICATIONS

Google Scholar/Patents search—text refined (Year: 2023).*
Google Scholar/Patents—text refined (Year: 2021), 11 pages. [Retrieved Oct. 9, 2021].

* cited by examiner

METHOD FOR MIGRATING CPU STATE FROM AN INOPERABLE CORE TO A SPARE CORE

PRIORITY INFORMATION

This application is a continuation of U.S. application Ser. No. 16/735,564, filed Jan. 6, 2020, which is a continuation of U.S. application Ser. No. 15/632,567, filed Jun. 26, 2017 (now U.S. Pat. No. 10,528,351), which is a continuation of U.S. application Ser. No. 14/549,742, filed Nov. 21, 2014 (now U.S. Pat. No. 9,710,273); the disclosures of each of the above-referenced applications are incorporated by reference herein in their entireties.

BACKGROUND

Technical Field

The embodiments disclosed within relate to integrated circuits, and more particularly, to the operation of multi-core processors.

Description of the Related Art

Processors are used in a variety of applications ranging from desktop computers to cellular telephones. In some applications, multiple processors or processor cores may be connected together so that computation tasks may be shared among the various processors. Whether used individually, or as part of group, processors make use of sequential logic circuits, internal memory, registers, state machines and the like, to execute program instructions and operate on input data.

Modern processors typically include various functional blocks, each with a dedicated task. For example, a processor may include an instruction fetch unit, a memory management unit, and an arithmetic logic unit (ALU). An instruction fetch unit may prepare program instructions for execution by decoding the program instructions and checking for scheduling hazards. Arithmetic operations such as addition, subtraction, multiplication, and division as well as and Boolean operations (e.g., AND, OR, etc.) may be performed by an ALU. Some processors include high-speed memory (commonly referred to as "cache memories" or "caches") used for storing frequently used instructions or data.

With various functional blocks operating on, exchanging, and calculating various groups of data, potential exist for problems to occur within a processor. During operation, a processor core may enter a state from which it cannot continue executing instructions. A core may enter such an inoperable state for a variety of reasons, including reading data from an uninitialized memory location, waiting for data in a memory location to change, waiting for a response from an idle or unresponsive peripheral device or coprocessor, a glitch occurring on a clock or other input signal that causes only a portion of the core's logic to react, physical damage to a circuit element in the core, etc.

Once a core enters an inoperable or "stalled" state, the core may require a reset to exit the stalled state and restart execution of a software process it that was previously executing, resulting in a loss of processing time and potentially delaying other processor cores waiting on output from the inoperable core. In other embodiments, the core may need to be powered off and then powered back on to exit the stalled state. Sometimes referred to as "power cycling," this may result in a greater loss of processing time potentially causing greater delays as other cores in the processor being power cycled may also have to restart execution of their respective software processes. In some embodiments, particularly if physical damage either cased or resulted from the inoperable core, then a system including the core may be disabled and replaced, which could result in an extended period of "downtime" in which the system is unusable.

SUMMARY

Various embodiments of an apparatus and a method for processing machine independent number formats are disclosed. Broadly speaking, a method and apparatus are contemplated in which an apparatus may include a plurality of cores, including a first core, a second core and a third core, and circuitry coupled to the first core. The first core may be configured to process a plurality of instructions. The circuitry may be configured to detect that the first core stopped committing a subset of the plurality of instructions, and to send an indication to the second core that the first core stopped committing the subset of the plurality of instructions. The second core may be configured to disable the first core from further processing instructions of the subset in response to receiving the indication, and to copy data from at least one memory location of the first core to at least one memory location of a third core in response to disabling the first core. The third core may be configured to resume processing the subset of the plurality of instructions dependent upon the data.

In a further embodiment, the second core may be further configured to operate in a first mode wherein the first mode prevents access to the at least one memory location of the first core. The second core may then enter a second mode from the first mode in response to receiving the indication, wherein the second mode allows access to the at least one memory location of the first core. Then the second core may disable the first core from processing further instructions of the subset of the plurality of instructions in response to entering the second mode.

In another embodiment, the plurality of cores may be organized into a first subset of cores and a second subset of cores, wherein the first core is in the first subset and the second core is in the second subset. In one embodiment, the second core may be further configured to allow the first core to reach a given state in response to receiving the indication and then disable the first core from processing instructions of the plurality of instructions excluded from the subset in response to the first core reaching the given state. In a further embodiment, the third core may be further configured to process the instructions of the plurality of instructions excluded from the subset dependent upon the data.

In a given embodiment, to detect that the first core has stopped committing the subset of the plurality of instructions, the circuitry may be further configured to increment a counter in response to a determination that an instruction of the subset of the plurality of instructions has not been committed during a pre-determined time period. The circuitry may also be configured to assert an error signal in response to a determination that a value of the counter is greater than or equal to a threshold value.

In another embodiment, in order to copy the data from the at least one memory location in the first core to the at least one memory location in the third core, the second core may be further configured to copy the data from the at least one memory location in the first core to a buffer memory. The second core may be configured to then identify the third core dependent upon an activity level of each core of the plurality of cores. Then the second core may be configured to copy the data from the buffer memory to the at least one memory location in the third core.

Figure 1:
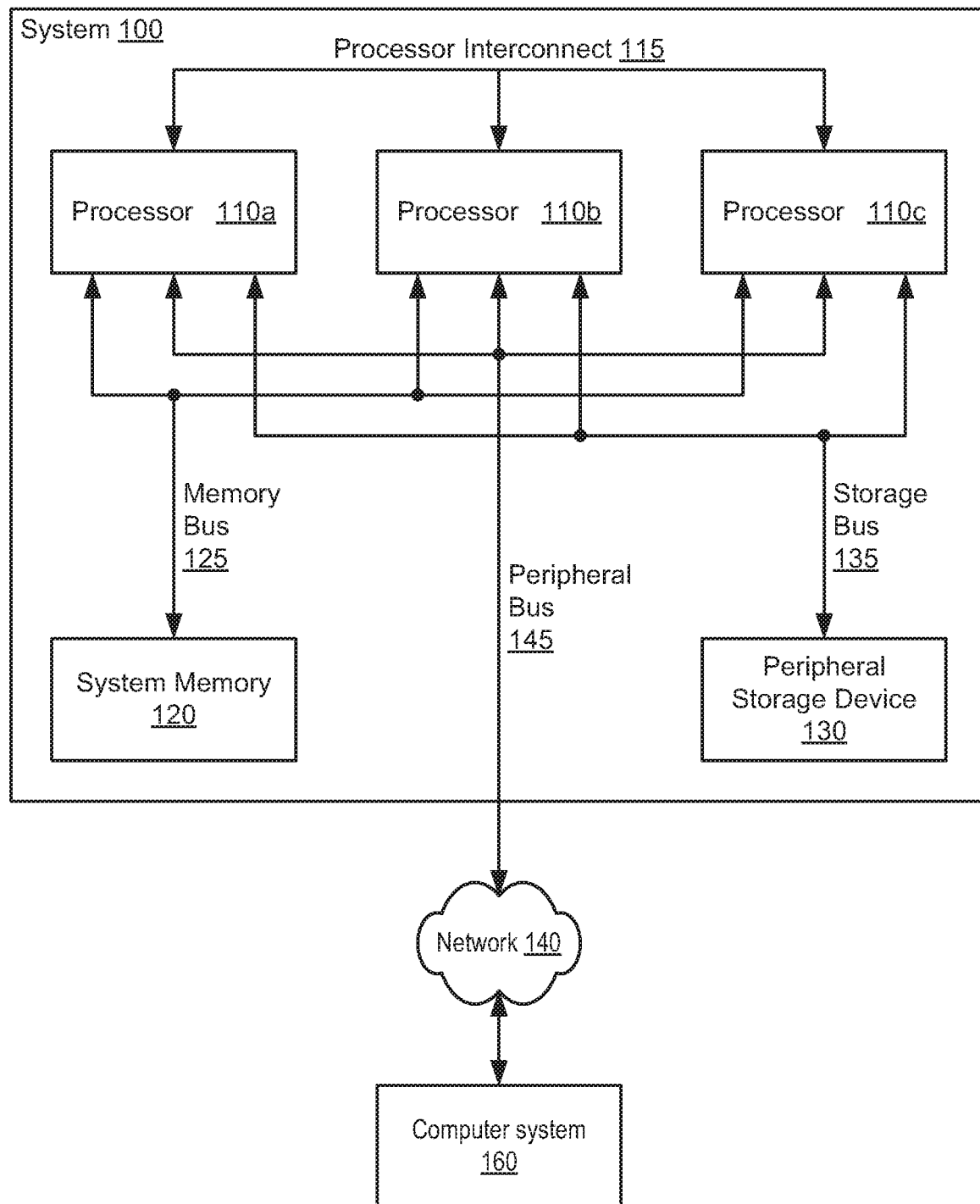
FIG. 1 is a block diagram of an embodiment of a multi-processor system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f), interpretation for that unit/circuit/component.

DETAILED DESCRIPTION OF EMBODIMENTS

Various functional blocks included in a processor core may each perform one or more tasks. The variety of tasks may, in some embodiments, be interdependent to one another, and may require, in some cases, synchronized timing for proper operation. If, for example, an event (i.e., power surge or dip, glitch or noise on an input signal, etc.) causes a disruption to the synchronicity of the functional blocks, then the processor core may unintentionally enter a stalled (also referred to as a "hung" or "stuck") state.

Once a core enters a stuck state, the core may require a reset, a power cycle, or even a physical replacement of parts. Any of these cases may result in a period of "downtime" in which the system is unusable as the stuck processor recovers and restarts execution of its software process. In various cases, downtime may be on the order of seconds or minutes for a reset or a power cycle, up to days, weeks or even months if a part of the system requires replacement. In some embodiments, multiple cores may be included in the system while only one core may be stuck in a particular occurrence.

Systems and methods described herein disclose embodiments that may reduce or eliminate downtime by transferring execution of a process from a stuck core to another core in a system. In some embodiments, downtime may be avoided by continuing to operate without the stuck core, until there is reduced demand for processing power at which time the stuck core may be reset or power cycled with less impact to performance. In other embodiments, the system may continue to operate until a replacement part is available.

Computing System Overview

A block diagram illustrating an embodiment of a multi-processor system is shown in FIG. 1. In the illustrated embodiment, system 100 includes a plurality of processors 110*a-c* coupled to system memory 120 via memory bus 125, and coupled to peripheral storage device 130 via storage bus 135. System 100 may be coupled to a network 140 via peripheral bus 145, which, in turn, may be coupled to a computer system 160. The plurality of processors 110*a-c* may additionally be coupled to each other via processor interconnect 115. In various embodiments, system 100 may be configured as a rack-mountable server system, a stand-alone system, or in any suitable form factor. In some embodiments, system 100 may be configured as a client system rather than a server system.

System memory 120 may include any suitable type of memory, such as Fully Buffered Dual Inline Memory Module (FB-DIMM), Double Data Rate or Double Data Rate 2 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed. For example, system memory 120 may, in some embodiments, include a respective memory device for each of processors 110*a-c*. System memory 120 may be coupled to processors 110*a-c* via memory bus 125, which may support one or more standard memory interfaces such as any combination of DDR memory interfaces.

Peripheral storage device 130 may, in some embodiments, include magnetic, optical, or solid-state storage media such as hard drives, optical disks, non-volatile random-access memory devices, etc. In other embodiments, peripheral storage device 130 may include more complex storage devices such as disk arrays or storage area networks (SANs). Peripheral storage device 130 may be coupled to processors 110*a-c* via storage bus 135. Storage bus 135 may correspond to a standard Small Computer System Interface (SCSI), a Fibre Channel interface, a Serial AT Attachment interface (SATA), a Firewire® (IEEE 1394) interface, or another suitable interface. Additionally, it is contemplated that in other embodiments, any combination of suitable peripheral devices may be coupled to processors 110*a-c*, such as multi-media devices, graphics/display devices, standard input/output devices, etc.

As described in greater detail below, each of processors 110*a-c* may include one or more processor cores, co-processors and cache memories. In some embodiments, each of processors 110*a-c* may be coupled to a corresponding system memory, while in the illustrated embodiment, processors 110*a-c* may share a common system memory, coupled via memory bus 125. Processors 110*a-c* may be configured to work concurrently on a single computing task and may communicate with each other to coordinate processing on that task. For example, a computing task may be divided into three parts and each part may be assigned to one of processors 110*a-c*. Alternatively, processors 110*a-c* may be configured to concurrently perform independent tasks that require little or no coordination among processors 110*a-c*. Processors 110*a-c* may be coupled to each other via processor interconnect 115. In some embodiments, processor interconnect 115 may be a limited access bus allowing one core to access registers and/or memory in another core. Access through processor interconnect 115 may be limited to cores running in a privileged or restricted operating mode. More details regarding processor interconnect will be presented below.

The embodiment of the multi-processor system illustrated in FIG. 1 is one of several examples. In other embodiments, different numbers and configurations of components are possible and contemplated. For example, multiple instantiations of system memory and/or computer system 160 are contemplated.

Processor Overview

Figure 2:
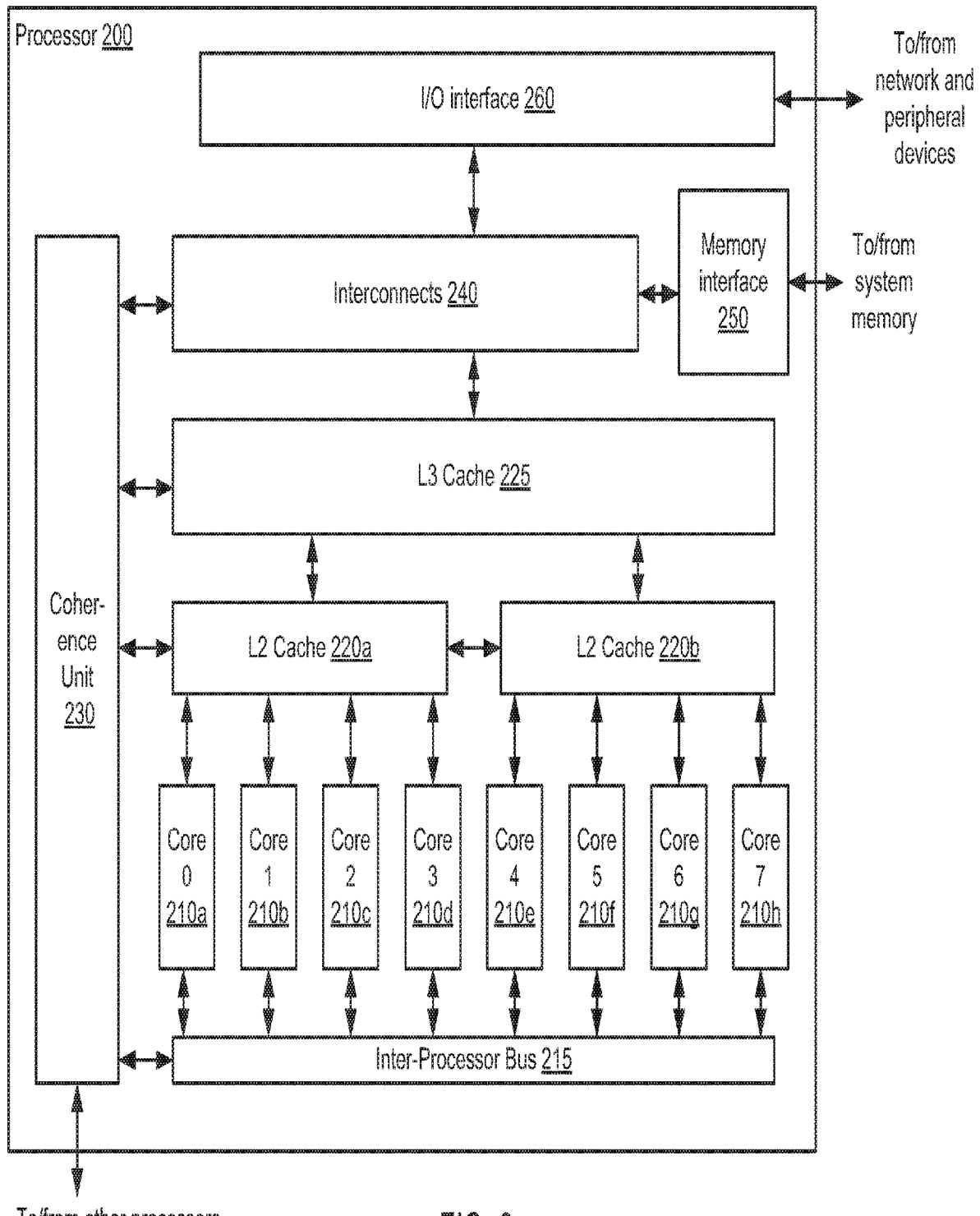
FIG. 2 is a block diagram of an embodiment of a multicore processor.

Turning now to FIG. 2, a block diagram illustrating one embodiment of a multicore processor 200 is shown. In some embodiments, processor 200 may correspond to a given processor 110*a-c* of system 100 in FIG. 1. In the illustrated embodiment, processor 200 may include a plurality of processor cores 210*a-h*, which are also designated "core 0" though "core 7." It is noted that although 8 cores are shown, in various embodiments, any suitable number of processor cores may be employed. Each of cores 210 may be coupled to inter-processor bus 215 as well as to either L2 cache 220*a* or L2 cache 220*b*. L2 caches 220*a-b* may be coupled to L3 cache 225. L3 cache 225 may be coupled to coherency unit 230 and to interconnects 240. Coherence unit 230 may be additionally coupled to inter-processor bus 215, L2 caches 220*a-b* and interconnects 240. Interconnects 240 may be coupled to, input/output (I/O) interface 260 and memory interface 250, which may be coupled in turn to one or more banks of system memory (not shown). I/O interface 260 may also be coupled to one or more network or peripheral devices (also not shown). In some embodiments, the elements included in processor 200 may be fabricated as part of a single integrated circuit (IC), for example on a single semiconductor die.

Cores 210*a-h* may be configured to process instructions and data according to a particular instruction set architecture (ISA). In one embodiment, cores 210 may be configured to implement the SPARC® V9 ISA, although in other embodiments it is contemplated that any desired ISA may be employed, such as x86, PowerPC®, ARM® or MIPS®, for example. In the illustrated embodiment, each of cores 210*a-h* may be configured to operate independently of the others, such that all cores 210*a-h* may process instructions in parallel. Additionally, in some embodiments, each of cores 210*a-h* may be configured to process multiple threads concurrently, where a given thread may include a set of instructions that may execute independently of instructions from another thread. (For example, an individual software process, such as an application, may consist of one or more threads that may be scheduled for execution by an operating system.) Such a core 210 may also be referred to as a multithreaded (MT) core. In one embodiment, each of cores 210*a-h* may be configured to concurrently process instructions from eight threads, for a total of 64 threads concurrently executing across processor 200. However, in other embodiments it is contemplated that other numbers of cores 210*a-h* may be provided, and that cores 210*a-h* may concurrently process different numbers of threads.

Cores 210*a-h* may be coupled to each other via inter-processor bus 215. Inter-processor bus 215 may allow a first core to access registers and/or memory within another core. For example, core 210*e* may be able to read internal registers and memory from core 210*c* and copy the read data to similar registers and memory into core 210*h*. In some embodiments, inter-processor bus may be coupled to each core 210*a-d* directly, while in other embodiments, inter-processor bus 215 may be coupled to each core 210*a-d* via one or more caches, such as L2 caches 220*a-b*.

Gaining access to another core's internal registers and memory may require use of restricted instructions and/or access to restricted memory locations. In some embodiments, restricted instructions or restricted memory locations may be accessed if the first core is operating in a special operating mode. Cores 210*a-h* may be capable of operating in a variety of modes, including a normal run mode and a privileged mode. In some embodiments, a core 210 may be required to be in the privileged mode to access memory of another core 210. Other embodiments may include another privileged mode, such as a hyper-privileged mode, which may provide a core 210 running in a hyper-privileged mode with access to the restricted commands and/or memory locations within a system. This hyper-privileged mode may be required, in such embodiments, for accessing internal registers and memory of other cores 210*a-h*. In some embodiments, a given core 210 may prevent itself from accessing memory of another core 210 when the given core 210 is not operating in the privileged or hyper-privileged mode. In other embodiments, the prevention of accessing the memory of another core 210 may be controlled by another circuit in multicore processor 200, such as a memory controller, for example, or by another device in system 100, such as a security processor, for example.

L2 cache 220*a* and L2 cache 220*b* may cache instructions and data for use by cores 210*a-d* and cores 210*e-h*, respectively. In the illustrated embodiment, each L2 cache 220 may be organized into four separately addressable banks, corresponding to a respective core 210, that may each be independently accessed, such that in the absence of conflicts, each bank may concurrently return data to its respective core 210. In some embodiments, each individual bank may be implemented using set-associative or direct-mapped techniques. L2 caches 220*a-b* may be implemented in some embodiments as writeback caches in which written (dirty) data may not be written to system memory until a corresponding cache line is evicted.

L3 cache 225 may also cache instructions and data for use by cores 210*a-h*. In the illustrated embodiment, L3 cache 225 may be organized into eight separately addressable banks that may each be independently accessed, such that in the absence of conflicts, each bank may concurrently return data to a respective core 210. In some embodiments, each individual bank may be implemented using set-associative or direct-mapped techniques. For example, in one embodiment, L3 cache 225 may be a 48 megabyte (MB) cache, where each bank is 16-way set associative with a 64-byte line size, although other cache sizes and geometries are possible and contemplated. Similar to L2 caches 220a-b, L3 cache 225 may be implemented in some embodiments as a writeback cache in which written data may not be written to system memory until a corresponding cache line is evicted.

Memory addresses corresponding to data currently stored in L3 cache 225, L2 caches 220a-b, or internal memory of cores 210a-h (e.g., L1 cache) may be tracked by coherency unit 230. In a processor with a multi-level cache configuration, data from a given memory address in system memory may be concurrently stored in two or more levels of cache. Coherency unit 230 may mark or "tag" data stored in a cache (e.g., L3 cache 225) if the data from the same memory address is modified in another cache (e.g. L2 cache 220a). To perform such functions, coherency unit 230 may have access to all levels of cache memory.

Interconnects 240 may provide a communications network to the various functional blocks in processor 200. Interconnects 240 may support one or more bus types, such as, for example, token rings, point-to-point, or mesh interconnects. One or more cores 210a-h may access system memory, network devices or other peripheral devices via interconnects 240. Interconnects 240 may support parallel access to I/O interface 260 and memory interface 250.

Memory interface 250 may manage the transfer of data between L3 cache 225 and system memory, for example, in response to L3 fill requests and data evictions. In some embodiments, multiple instances of memory interface 250 may be implemented, with each instance configured to control a respective bank of system memory. Memory interface 250 may be configured to interface to any suitable type of system memory, such as system memory 120 described above in reference to FIG. 1. In some embodiments, memory interface 250 may be configured to support interfacing to multiple different types of system memory.

In the illustrated embodiment, processor 200 may also be configured to receive data from peripheral devices rather than system memory. I/O interface 260 may be configured to provide a central interface for such devices to exchange data with cores 210 and/or L3 cache 225 via interconnects 240. In some embodiments, I/O interface 260 may be configured to coordinate Direct Memory Access (DMA) transfers of data between external peripherals and system memory via interconnects 240 and memory interface 250. Peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, I/O interface 260 may implement one or more instances of interfaces such as Peripheral Component Interface Express (PCI Express™), Universal Serial Bus (USB) or IEEE 1394 (Firewire®).

I/O interface 260 may also be configured to coordinate data transfer between processor 200 and one or more devices (e.g., other computer systems) coupled to processor 200 via a network. In one embodiment, I/O interface 260 may be configured to perform the data processing in order to implement an Ethernet (IEEE 802.3) networking standard such as Gigabit Ethernet or 10-Gigabit Ethernet, for example, although it is contemplated that any suitable networking standard may be implemented. In some embodiments, I/O interface 260 may be configured to implement multiple discrete network interface ports.

The embodiment of the processor illustrated in FIG. 2 is an example merely for demonstrative purposes. In other embodiments, different configurations of components are possible and contemplated. For example, any suitable number of cores 210 may be included. FIG. 2 merely illustrates logical coupling of the various functional blocks and is not intended to demonstrate a physical layout of processor 200.

Core Overview

Figure 3:
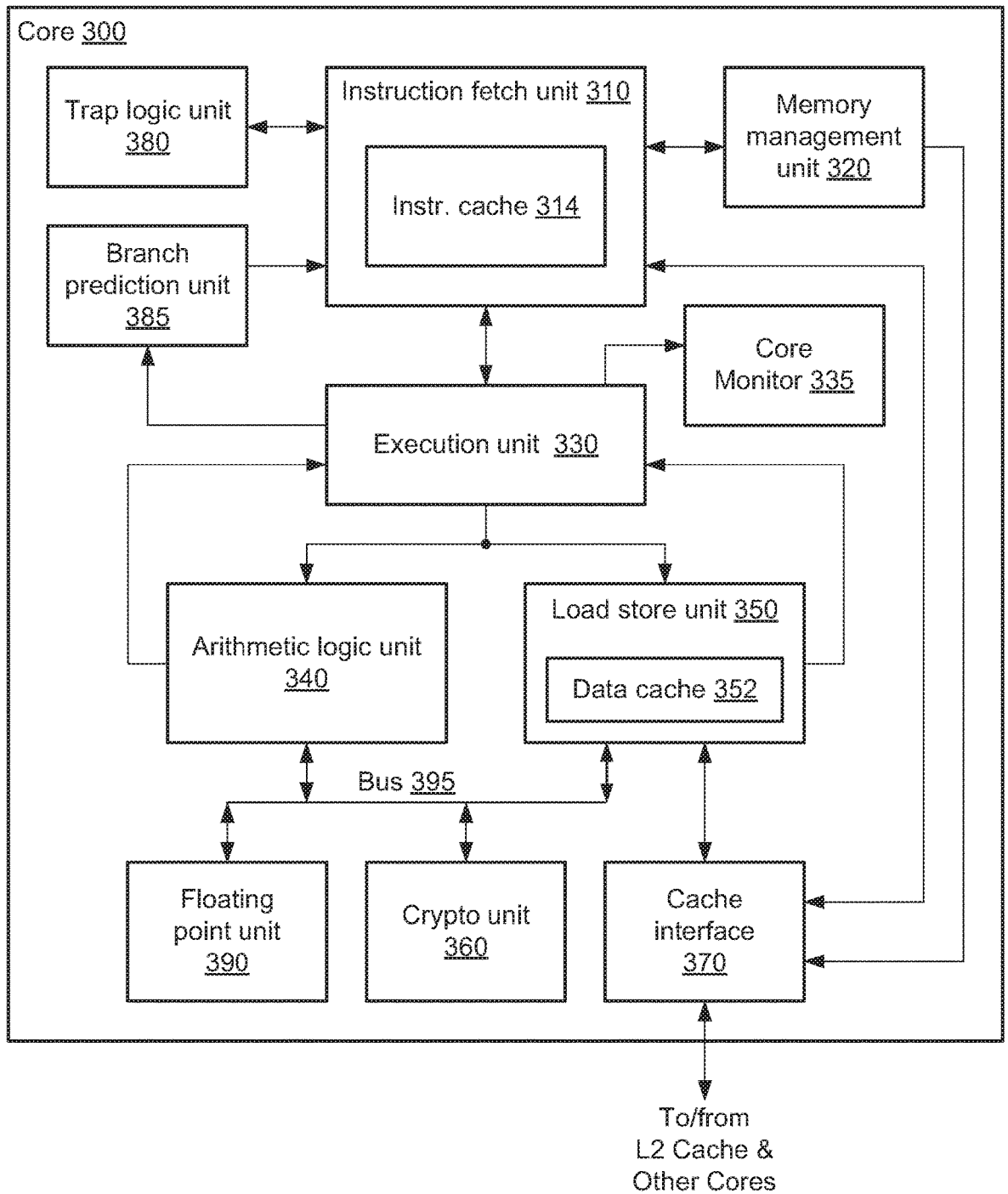
FIG. 3 is a block diagram of an embodiment of a processor core.

Moving now to FIG. 3, a possible embodiment of a core is illustrated. Core 300 may correspond to a given core 210 in FIG. 2. In the illustrated embodiment, core 300 includes instruction fetch unit (IFU) 310 may be coupled to memory management unit (MMU) 320, trap logic unit (TLU) 380, branch prediction unit (BPU) 385, cache interface 370, and execution unit 330. Execution unit 330 may be coupled to core monitor 335, arithmetic logic unit (ALU) 340, and load store unit (LSU) 350. ASU 340 and LSU 350 may also be coupled to send data back to execution unit 330. Both ALU 340 and LSU 350 may be coupled to cryptographic processing (crypto) unit 360, floating point unit (FPU) 390, and cache interface 370. Additionally, core monitor 335, ASU 340, LSU 350, crypto unit 360, and cache interface 370 may be coupled to bus 395, which may in turn be coupled to inter-processor bus 215 shown in FIG. 2.

Instruction fetch unit 310 may be configured to provide instructions to the rest of core 300 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 may further include an instruction cache 314. In one embodiment, IFU 310 may include logic to maintain fetch addresses (e.g., derived from program counters) corresponding to each thread being executed by core 300, and to coordinate the retrieval of instructions from instruction cache 314 according to those fetch addresses.

In one embodiment, IFU 310 may be configured to maintain a pool of fetched, ready-for-issue instructions drawn from among each of the threads being executed by core 300. For example, IFU 310 may implement a respective instruction buffer corresponding to each thread in which several recently-fetched instructions from the corresponding thread may be stored. In some embodiments, IFU 310 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups). In some embodiments, IFU 310 may be configured to further prepare instructions for execution, for example by decoding instructions, detecting scheduling hazards, arbitrating for access to contended resources, or the like. Moreover, in some embodiments, IFU 310 may support speculative issuing of instructions, i.e., instructions from a given thread may be speculatively issued from IFU 310 for execution depending on, for example, a history of code execution by core 300.

Branch prediction unit may include logic to predict branch outcomes and/or fetch target addresses, such as a Branch History Table (BHT), Branch Target Buffer (BTB), or other suitable structure, for example. BPU 385 may use the BHT to track a number of times an instruction branch is taken versus how often the instruction branch is not taken. BPU 385 may also track patterns of taking or not taking a particular branch. Using the data collected in the BHT, BPU 385 may populate the BTB with predictions of branches to be taken or not taken. IFU 310 may use the populated data in the BTB for determining instructions to be speculatively issued.

Execution unit 330 may be configured to process and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, core 300 may include more than one execution unit 330, and each of the execution units may or may not be symmetric in functionality. Each execution unit 330 may be capable of processing a given software thread. In the illustrated embodiment, instructions destined for ALU 340 or LSU 350 may pass through execution unit 330. However, in alternative embodiments it is contemplated that such instructions may be issued directly from IFU 310 to their respective units without passing through execution unit 330.

Arithmetic logic unit (ALU) 340 may be configured to execute and provide results for certain arithmetic instructions defined in the implemented ISA. For example, in one embodiment, ALU 340 may implement integer arithmetic instructions, such as add, subtract, multiply, divide, and population count instructions. In one embodiment, ALU 340 may implement separate execution pipelines for integer add/multiply, divide, and Boolean operations, while in other embodiments the instructions implemented by ALU 340 may be differently partitioned.

In the illustrated embodiment, floating point unit 390 may be implemented separately from ALU 340 to process floating-point operations while ALU 340 handles integer and Boolean operations. FPU 390 may implement single-precision and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. FPU 390 may, in some embodiments, be configured to store floating-point register state information for each thread in a floating-point register file. In one embodiment, FPU 390 may implement separate execution pipelines for floating-point add/multiply, divide/square root, and graphics operations. In other embodiments, ALU 340 and FPU 390 may be implemented as a single logic block.

Load store unit 350 may be configured to process data memory references, such as integer and floating-point load and store instructions as well as memory requests that may originate from other blocks within core 300, such as crypto processing unit 360, for example. In some embodiments, LSU 350 may also be configured to assist in the processing of instruction cache 314 misses originating from IFU 310. LSU 350 may include a data cache 352 as well as logic configured to detect cache misses and to responsively request data from an L2 cache via cache interface 370. In one embodiment, data cache 352 may be configured as a write-through cache in which all stores are written to L2 cache regardless of whether they hit in data cache 352; in some such embodiments, stores that miss in data cache 352 may cause an entry corresponding to the store data to be allocated within data cache 352. In other embodiments, data cache 352 may be implemented as a write-back cache.

Additionally, in some embodiments LSU 350 may include logic configured to translate virtual data addresses generated by execution unit 330 to physical addresses, such as a Data Translation Lookaside Buffer (DTLB). In some such embodiments, virtual addresses may be translated into real addresses prior to translation to physical addresses. As used and described herein, a real address may correspond to a location in memory from the perspective of application or other software being executed in core 300.

LSU 350 may, in some embodiments, receive an instruction to read a memory location within another core, either in a same processor, such as processor 200 in FIG. 2, or in another processor in a system, such as system 100 in FIG. 1. Such as request may originate from execution unit 330 while operating in a privileged or hyper-privileged mode. In such an embodiment, LSU 350 may receive a request to read a memory location of a functional block in core 300, such as, for example, memory locations in ALU340.

Cryptographic processing unit 360 may be configured to implement one or more specific data processing algorithms in hardware. For example, crypto unit 360 may include logic configured to support encryption/decryption algorithms such as Advanced Encryption Standard (AES), Data Encryption Standard/Triple Data Encryption Standard (DES/3DES), or Rivest Cipher 4 (RC4). Crypto unit 360 may also include logic to implement hash or checksum algorithms such as Secure Hash Algorithm (SHA-1, SHA-256), Message Digest 5 (MD5), or Cyclic Redundancy Checksum (CRC). Crypto processing unit 360 may also be configured to implement modular arithmetic such as modular multiplication, reduction and exponentiation. In one embodiment, crypto unit 360 may be configured to utilize the arithmetic functions included in ALU 340. In various embodiments, crypto unit 360 may implement several of the aforementioned algorithms as well as other algorithms not specifically described.

Crypto processing unit 360 may be configured to execute as a coprocessor independent of integer or floating-point instruction issue or execution. For example, in one embodiment crypto unit 360 may be configured to receive operations and operands via control registers accessible via software; in the illustrated embodiment, crypto unit 360 may access such control registers via LSU 350. In such embodiments, crypto unit 360 may be indirectly programmed or configured by instructions issued from IFU 310, such as instructions to read or write control registers. However, even if indirectly programmed by such instructions, crypto unit 360 may execute independently without further interlock or coordination with IFU 310.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. In such an embodiment, virtual to physical address translation may occur by mapping a virtual page number to a particular physical page number, leaving the page offset unmodified. Such a translation of mappings may be stored in an instruction translation lookaside buffer (ITLB) or a data translation lookaside buffer (DTLB) for rapid translation of virtual addresses during lookup of instruction cache 314 or data cache 352. In the event no translation for a given virtual page number is found in the appropriate TLB, memory management unit 320 may be configured to provide a translation. In one embodiment, MMU 320 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 320 is unable to derive a valid address translation, for example if one of the memory pages including a page table is not resident in physical memory (i.e., a page miss), MMU 320 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 300 may be configured to generate memory or I/O requests external to core 300. For example, IFU 310 or LSU 350 may generate access requests to an L2 cache 220 in FIG. 2 in response to their respective cache misses. Crypto processing unit 360 may be configured to generate its own load and store requests independent of LSU 350, and MMU 320 may be configured to generate memory requests while executing a page table walk. Other types of off-core memory access requests are possible and contemplated. In the illustrated embodiment, cache interface 370 may be configured to provide a centralized interface to the port of an L2 cache 220 in FIG. 2 associated with a particular core 210, on behalf of the various functional units that may generate memory accesses. In one embodiment, cache interface 370 may also be configured to receive data returned via an L2 cache 220, and to direct such data to the appropriate functional unit (e.g., data cache 352 for a data cache fill due to miss). Cache interface 370 may, in some embodiments, be coupled to other cores in a multicore processor, such as processor 200 in FIG. 2, either through a bus such as interprocessor bus 215, or through a cache, such as one of L2 caches 220.

During the course of operation of some embodiments of core 300, exceptional events may occur. For example, an instruction from a given thread that is picked for execution by IFU 310 may not be a valid instruction for the ISA implemented by core 300 (e.g., the instruction may have an illegal opcode), a floating-point instruction may produce a result that requires further processing in software, MMU 320 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 380 may be configured to manage the handling of such events. For example, TLU 380 may be configured to receive notification of an exceptional event occurring during execution of a particular thread, and to cause execution control of that thread to vector to a privileged mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 380 may flush all instructions from the trapping thread from any stage of processing within core 300, without disrupting the execution of other, non-trapping threads. In some embodiments, when a specific instruction from a given thread causes a trap (as opposed to a trap-causing condition independent of instruction execution, such as a hardware interrupt request), TLU 380 may implement such traps as precise traps. That is, TLU 380 may ensure that all instructions from the given thread that occur before the trapping instruction (in program order) commit and update architectural state, while no instructions from the given thread that occur after the trapping instruction (in program order) commit or update architectural state.

Several functional blocks in core 300, such as FPU 390, ALU 340, LSU 350, and crypto unit 360, may be coupled to bus 395. Bus 395 may provide a communication path among these functional blocks. In some embodiments, bus 395 may also provide a path from memory locations in the coupled functional blocks to other cores in a multicore processor such as processor 200, via LSU 350 and cache interface 370. In such an embodiment, another core may issue a read command to read memory locations of, for example, FPU 390. The example read command may be received by LSU 350 via cache interface 370, and then the requested memory locations read by way of bus 395. As described above in regards to inter-processor bus 215, access to a first core by a second core may require the second core to be operating in a privileged or hyper-privileged mode.

Core monitor 335 may be coupled to execution unit 330 to determine if execution unit 330 is actively committing instructions. In some embodiments, core monitor 335 may be disabled if core 300 is idle, i.e., core 300 has no instructions in instruction cache 314 to execute. If instruction cache 314 contains instructions for execution, then core monitor 335 may determine if the instructions are being committed. To perform this task, core monitor 335 may include a counter circuit. The counter circuit may be configured to increment in response to one or more rising or falling transitions of a clock signal input to core 300. The counter circuit may be configurable to assert a signal upon incrementing up to a predetermined threshold value. Core monitor 335 may reset the counter circuit each time committing of an instruction is detected. If the counter circuit reaches the threshold value, then core monitor 335 may determine that execution unit 330 has ceased committing instructions, i.e., execution unit 330 is "stuck," "stalled," or "hung." In response to determining execution unit 330 is stuck, core monitor 335 may assert a signal which may be stored in an error register.

It is noted that, as used herein, "committing" or to "commit" an instruction may refer to processing of an instruction including the instruction being executed, completed, and results of the instruction being saved in an appropriate memory and available for use by a subsequent instruction. In some embodiments, instructions may be processed in-order, while, in other embodiments, out-of-order processing of instructions may be permitted. More details regarding in-order and out-of-order processing of instructions will be described later.

A software process running on a second core may detect the stored error condition and in response, disable core 300 from committing further instructions. In some embodiments, disabling core 300 may include letting core 300 continue to committing one or more instructions to reach a suitable stopping point. For example, if core 300 supports out-of-order processing of instructions, then older instructions may be allowed to commit before disabling core 300. The second core may also copy contents of registers, caches, and other memory locations within core 300 to a third core in order to enable the third core to resume execution one or more software threads assigned to core 300. Bus 395 may be used by the second core for copying the various internal memory locations and registers of core 300 to the third core.

In some embodiments, in which core 300 is multi-threaded and therefore includes multiple execution units 330, core 300 may include a core monitor 335 for each respective execution unit 330, or a single core monitor 335 may include a counter circuit for each respective execution unit 330. In such embodiments, if one execution unit 330 is determined to be stuck, all execution units 330 may be halted and all software threads executing in core 300 may be transferred to another core.

It is noted that although the counter circuit described above is stated to increment to a threshold value, many variations of counter circuits are known and contemplated for use in core monitor 335. For example, a counter circuit may decrement from a predetermined value down to a terminal value, such as zero. Other examples may include decrementing from a constant starting value to the predetermined value, or incrementing from the predetermined value to a constant end value.

The embodiment of the core illustrated in FIG. 3 is one of multiple contemplated examples. Other embodiments of a core may include a different number and configuration of components. For example, ALU 340 and FPU 390 may be implemented as a single functional block rather than two separate units.

Core Memory

Figure 4:
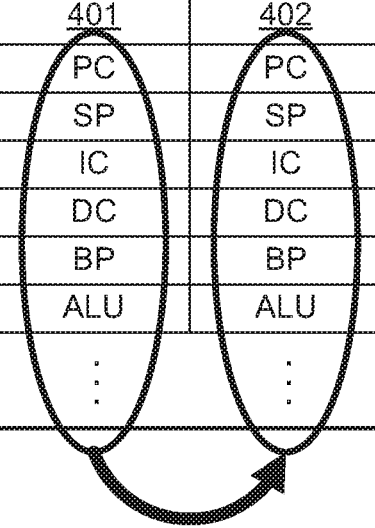
FIG. 4 illustrates a table indicating movement of data values from a first core to a second core.

Turning to FIG. 4, two tables are illustrated indicating movement of data values from a first core to a second core. Tables 400a-b may represent memory states for various memory locations in core A 401 and core B 402. Each of core A 401 and core B 402 may, in some embodiments, correspond to core 300 as illustrated in FIG. 3 and core A 401 and core B 402 may together correspond to two of cores 210a-h in processor 200 as depicted in FIG. 2. Table 400 includes row 411 corresponding to a program counter value, PC, row 412 corresponding to a stack pointer value, SP, row 413 corresponding to one or more values from an instruction cache, IC, row 414 corresponding to one or more values from a data cache, DC, row 415, corresponding to one or more values from branch prediction tables, BP, and row 416, corresponding to one or more values from an arithmetic logic unit, ALU. More memory locations may exist in core A 401 and core B 402, but are not shown for the sake of brevity.

Table 400a may correspond to memory locations while core A 401 may be executing an assigned software thread and while core B 402 may be idle. The values in the core A 401 column may represent the current operating values for the respective rows responsive to the software thread execution. Since core B 402 is idle in this example, its current operating values may be in an indeterminate or reset state, represented by "x." During the course of executing the software thread, core A 401 may become stuck. A variety of causes are known and contemplated for core A 401 to become stuck. For example, a glitch on a clock signal caused by a power spike or radiated electro-magnetic noise may cause a portion of a circuit to enter an unintended state. In some embodiments, under certain conditions, an undetermined state may case core A 401 to become unresponsive and cease execution of instructions, i.e., become stuck. A monitoring circuit, such as core monitor 335 in FIG. 3, may determine that core A 401 has become stuck and may assert an error indication in response.

Circuitry, such as, for example, a third core, may detect the error indication and disable core A 401 from executing further instructions. In other embodiments, the circuitry may correspond to a watchdog monitor configured to monitor a system for undesired behavior and take steps to correct or isolate circuits exhibiting such behavior. The circuitry may then copy the values of the memory locations internal to core A 401 and copy these to the idle core B 402, as illustrated in table 400b. Once all memory locations of core A 401 have been copied to corresponding memory locations in core B 402, the circuitry may enable core B 402 to resume execution of the software thread initially assigned to core A 401 and now re-assigned to core B 402.

In order to disable core A 401 and copy values of the memory locations from core A 401 to core B 402, the circuitry may need to be operating in a privileged or hyper-privileged mode. The assertion of the error indication, or, in other embodiments, the detection of the error indication may cause the circuitry to enter the privileged or hyper-privileged mode. In the case of the circuitry corresponding to a third core, the third core may receive the error indication in form of an exception or a software trap. The exception or trap may cause the third core to enter the necessary mode for disabling the stuck core A 401 and copying the values from core A 401 to core B 402. A similar process may occur if the circuitry corresponds to a watchdog monitor.

It is noted that tables 400a-b illustrated in FIG. 4 are merely examples of types of data that may be included in a given core. The memory locations are presented in a tabular format for clarity, and are not intended to imply that the memory locations are organized into one or more tables. In some embodiments, the memory locations shown in tables 400a-b may represent a limited number of the overall memory locations in a given core. Additionally, in other embodiments, core A 401 may correspond to a core in processor 110b in FIG. 1 and core B 402 may correspond to a core in processor 110c.

Figure 5:
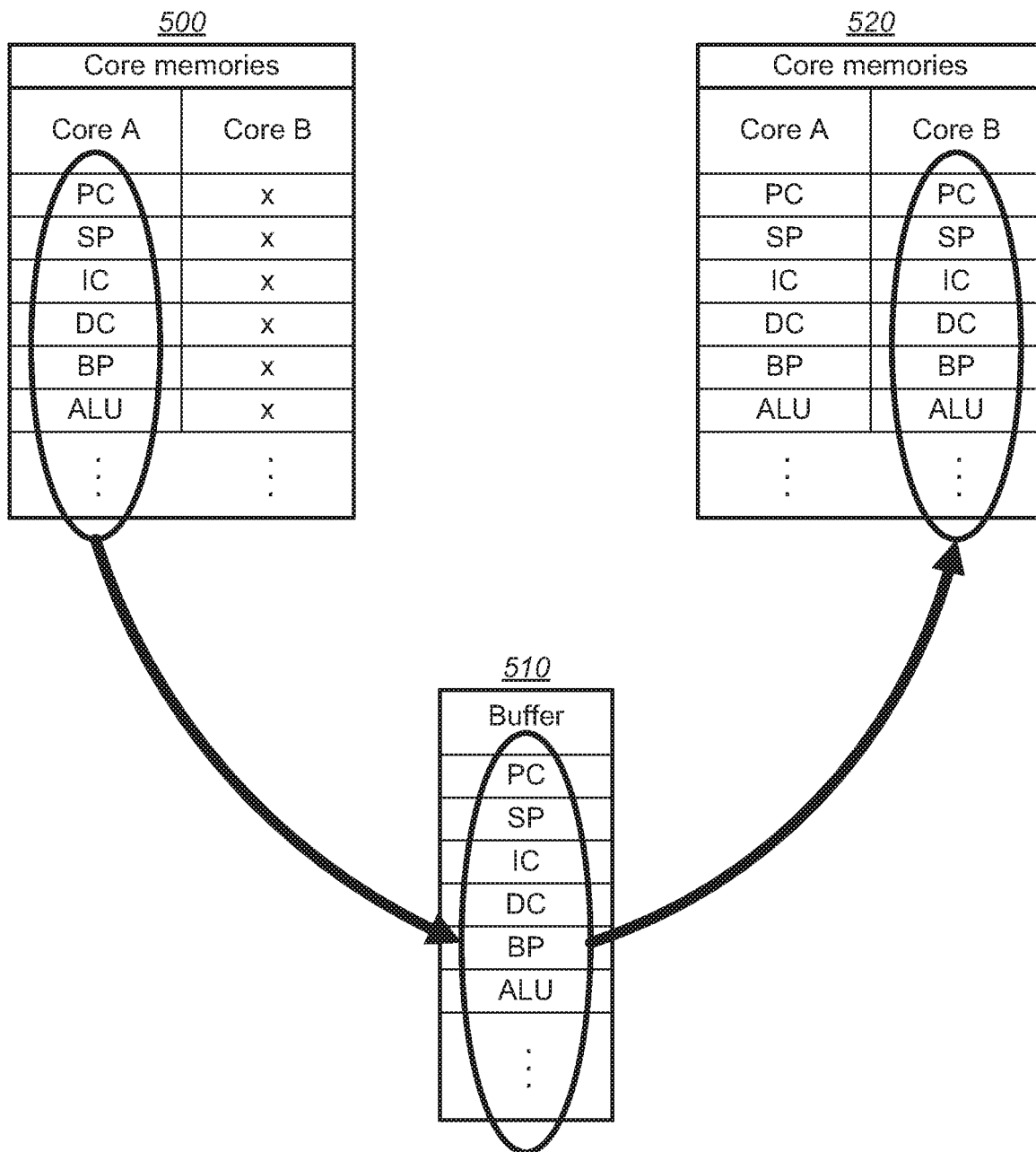
FIG. 5 illustrates three tables indicating movement of data values from a first core to a second core via a memory buffer.

Moving to FIG. 5, an embodiment of tables indicating movement of data values from a first core to a second core via a memory buffer is illustrated. FIG. 5 includes three tables: table 500, table 510 and table 520, representing various memory locations that may be included in the first core, the memory buffer, and the second core, respectively. Tables 500 and 520, similar to tables 400a-b in FIG. 4, may show memory states for core A and core B. Table 510 may show contents of a memory buffer.

Table 500 may be similar to table 400a in FIG. 4, i.e., table 500 may correspond to memory locations in core A and core B while core A executes instructions of a software thread and while core B is idle. As described above in regards to table 400a, core A may become stuck in response to any of a number of causes. A monitoring circuit may detect the stuck condition of core A and indicate the stuck state in an error register, by setting or clearing one or more data bits of the error register. A supervisor unit, such as another core executing a supervisor software process or a watchdog monitor, may enter a privileged mode and then may halt instruction execution in core A. Upon determining core A has halted execution, the supervisor unit may copy memory contents of core A to a buffer memory as shown in table 510. In some embodiments, the buffer memory may be a dedicated buffer for the supervisor unit while, in other embodiments, the buffer memory may correspond to an allocated range of system memory.

After copying core A's memory contents to the buffer memory, the supervisor unit may determine if another core is idle and capable of being receiving and resuming core A's software thread. Idle core B may be selected and the supervisor unit may copy the contents of the buffer memory to internal memory of core B. Having received core A's memory contents, the supervisor unit may enable core B to resume execution of the software thread.

The process of copying core A's memory contents to the buffer memory and the subsequent copying of the buffer memory contents to the internal memory of core B may require some amount of time. In some embodiments, this time for memory copying may influence the selection of core B. For example, core B may be processing another software thread and the delay for copying core A's memory contents to the buffer memory may allow core B to complete processing of the software thread. The time for copying the memory contents may also require "reserving" or "scheduling" core B as a replacement core in order to prevent an operating system from scheduling core B for another software thread.

It is noted that the tables illustrated in FIG. 5 are merely examples. As previously stated in regards to FIG. 4, the memory locations of FIG. 5 are presented in a tabular format for clarity, and are not intended to imply that the memory locations are organized into one or more tables. In some embodiments, the memory locations shown in the tables of FIG. 5 may represent a limited number of the overall memory locations in a given core. In other embodiments, the given core may not include all memory locations shown in FIG. 5.

Figure 6:
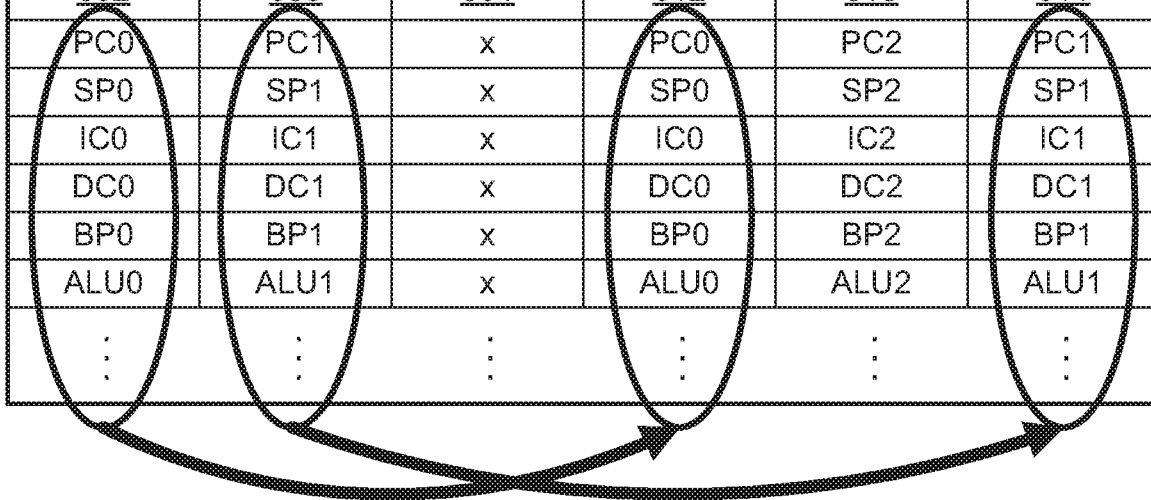
FIG. 6 includes two tables indicating movement of data values from a first multi-threaded core to a second multi-threaded core.

Turning now to FIG. 6, an embodiment of tables indicating movement of data values from a first multi-threaded core to a second multi-threaded core is illustrated. FIG. 6 includes two tables, table 600*a* and table 600*b*, representing various memory locations of a multi-threaded core. Tables 600*a-b* may be similar to tables 400*a-b* in FIG. 4, showing memory states for core A 601 and core B 611. In FIG. 6, however, core A 601 and core B 611 may correspond to multi-threaded cores capable of executing, in the illustrated embodiment, at least three software threads in parallel.

It is noted that the term "parallel" as used herein, refers to two or more actions occurring within a same time period, i.e., such as during one or more cycles of a received clock signal. In some cases, a first action may begin before a second action begins and may end before the second action ends. In regards to cores A 601 and B 611, two software threads may be considered to process in parallel if at least one instruction of each thread is executed during at least one same clock cycle. The term "parallel" is not intended to imply the two or more actions begin and end at precisely the same time.

In table 600*a*, core A 601 may be executing two threads: thread 0 602 and thread 1 603. Core B 611 may be executing a single thread, thread 4 613. One thread of core A 601, such as thread 1 603, may become stuck as previously described, while thread 0 602 may continue to execute. A monitor circuit may detect the stuck state of thread 1 603 and indicate the stuck state to the supervisor unit. The supervisor unit may, in response, enter into a privileged or hyper-privileged mode and then halt execution of thread 1 603. Thread 0 602 may also be halted under a presumption that any threads being executed by core A 601 are at risk of becoming stuck. The supervisor unit may then identify a core capable of assuming responsibility for executing stuck thread 1 603 as well as thread 0 602, for example, core B 611 which has two idle thread execution units, thread 3 612 and thread 5 614 as well as active thread 4 613. In some embodiments, core B 611 may be selected, while in other embodiments, a core with zero active threads may be selected.

The supervisor unit may copy memory contents from thread 0 602 in core A 601 to thread 3 612 in core B 611 and memory contents from thread 1 603 in core A 601 to thread 5 614 in core B 611. In some embodiments, execution of thread 4 613 in core B 611 may be paused while the memory copy occurs, while in other embodiments, thread 4 613 may continue execution. Core B 611 may be enabled to resume execution of thread 3 612 and thread 5 614, as well as thread 4 613 if it was paused.

It is noted that the tables illustrated in FIG. 6 are examples for demonstration. Once again, the memory locations of FIG. 6 are presented in a tabular format for clarity, and are not intended to imply that the memory locations are organized into one or more tables. The memory locations shown in tables 600*a-b* may, in some embodiments, include more and or different memory locations. In various embodiments, cores may include more or fewer execution threads per core.

Figure 7:
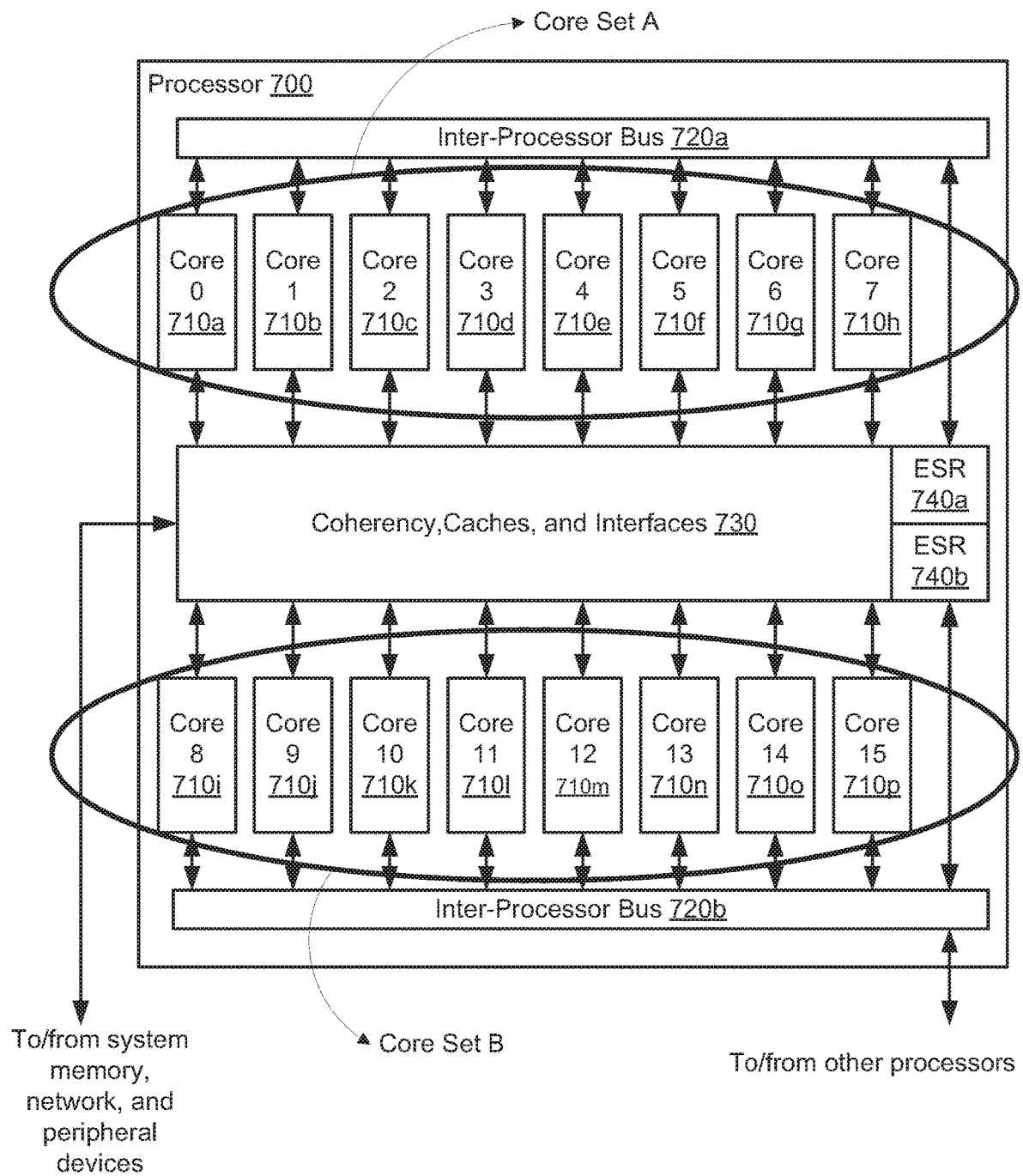
FIG. 7 is another block diagram of an embodiment of a processor.

Moving now to FIG. 7, another embodiment of a processor is illustrated. Processor 700 may, in some embodiments, correspond to an instance of processors 110*a-c* in FIG. 1. In the illustrated embodiment, processor 700 may include core 0 710*a* through core 7 710*h*, each coupled to inter-processor bus 720*a*, and may include core 8 710*i* through core 15 710*p*, each coupled to inter-processor bus 720*b*. Each of cores 710*a-p* may also be coupled to one or more coherency units, caches, and interfaces 730 grouped together as a single block for clarity. Two error status registers (ESR) 740*a-b* may also be included and coupled to interprocessor busses 720*a-b* and/or coupled to coherency units, caches, and interfaces 730.

Inter-processor bus 720*a* may also be coupled to inter-processor bus 720*b*. Each of inter-processor buses 720*a-b* may correspond to the description of inter-processor bus 215 in FIG. 2. In addition, inter-processor buses 720*a-b* may support communication between any of cores 710*a-p* to any other of cores 710*a-p* irrespective of the bus to which each core is coupled.

Coherency units, caches and interfaces 730 may represent a simplification of individual functional blocks included in processor 700. Coherency units, caches and interfaces 730 may include L2 and L3 caches, similar to L2 caches 220*a-b* and L3 cache 225 in FIG. 2. One or more coherency units, such as coherency unit 230, interconnects, such as interconnects 240, and various interfaces, such as memory interface 250 and I/O interface 260 as shown in FIG. 2 may be included in coherency units, caches and interfaces 730. Coherency units, caches and interfaces 730 may, therefore, provide access to off-chip memory, storage, and networks as described in regards to FIG. 2.

Each core of cores 710*a-p* may correspond to an instance of core 300 in FIG. 3. In various embodiments, each core of cores 710*a-p* may or may not be multi-threaded. Cores 710*a-h* may be grouped together as core set A and cores 710*i-p* may be grouped as core set B. Core set A and core set B may each designate one core or one thread execution unit in one core to execute a supervisor software thread. This supervisor thread may act as a system monitor responsible for, at least, monitoring a respective one of ESR 740*a-b*. In other words, a supervisor core in core set A may respond to a stuck core or stuck thread in core set B and vice versa. Each core of cores 710*a-p* may include a core monitor, such as core monitor 335 in FIG. 3. If a given core monitor detects a stuck thread in a respective core, then the monitor may indicate this by setting or clearing one or more bits in one of error status registers 740*a-b*. For example, if a core monitor in core 10 710*k* of core set B detects a stuck thread, the core monitor may then set or clear a bit in ESR 740*a*.

A designated core in core set A, such as core 6 710*g* for example, may detect the indication in ESR 740*a* and may enter a privileged or hyper-privileged mode. For example, the indication in ESR 740*a* may trigger an exception process or software trap in core 6 710*g* which may cause the core to enter the hyper-privileged mode. Once in the hyper-privileged mode, core 6 710g may halt further instruction execution of all threads in core 10 710k. Core 6 710g may then identify a core to resume execution of the threads halted in core 10 710k. In other embodiments, core 6 710g may first copy contents of core 10 710k to a buffer memory before identifying a replacement core. Core 6 710g may, in various embodiments, only select a core from core set A, only from core set B, or from either core set. In another embodiment, a given core of cores 710a-p, such as core 15 710p, for example, may be preselected as a reserve core and may not be assigned any software threads for execution until core 6 710g selects the reserve core to replace stuck core 10 710k. Once a replacement core is selected, supervisor core 6 710g may copy memory contents of core 10 710k to replacement core 15 710p and then enable the replacement core to resume execution of the software threads from stuck core 10 710k.

It is noted that the embodiment of the processor illustrated in FIG. 7 is merely an example. In other embodiments, different configurations of components are possible and contemplated. For example, cores 710a-p may be organized into any suitable number of core sets with a corresponding number of inter-processor buses and error status registers. Additionally, core sets may span across multiple processors in a multi-processor system such as system 100 in FIG. 1.

Methods for Stuck Core Recovery

Figure 8:
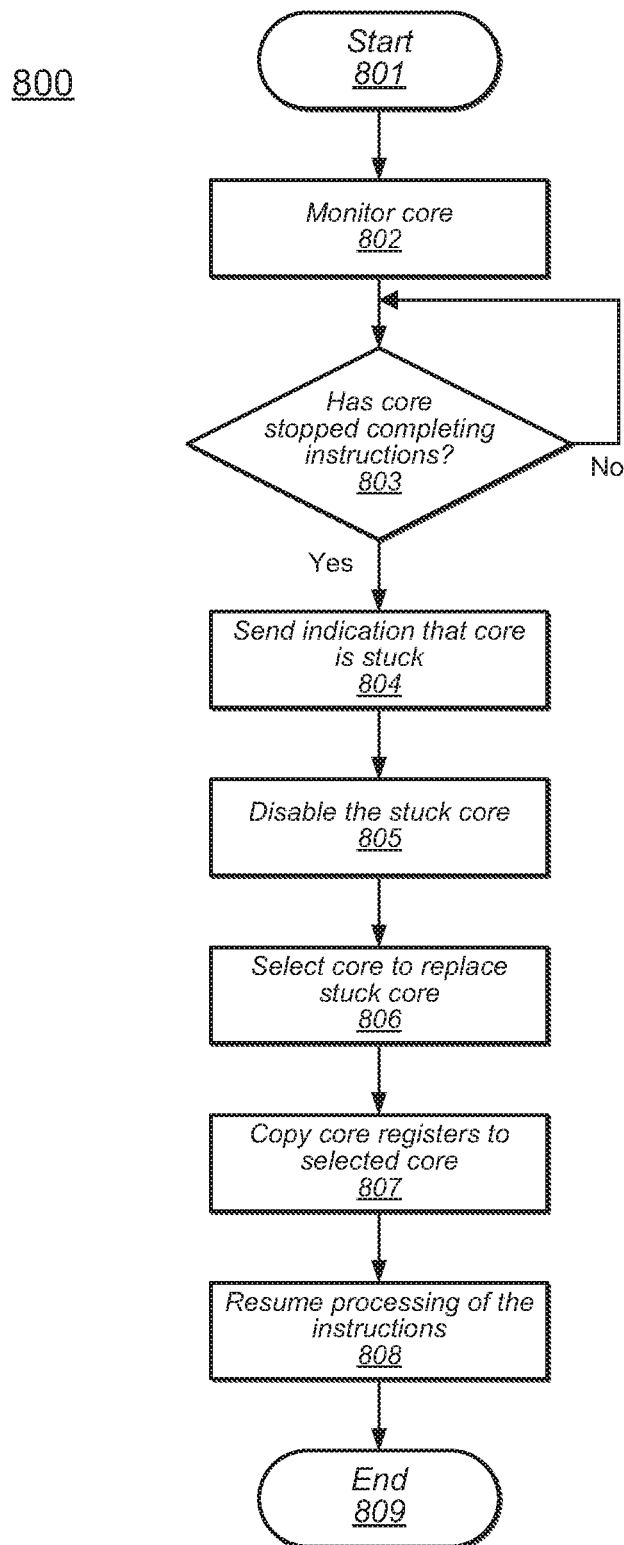
FIG. 8 illustrates a flowchart depicting an embodiment of a method for moving instruction processing from a first core to a second core.

Turning to FIG. 8, a flowchart depicting an embodiment of a method for moving instruction processing from a first core to a second core is illustrated. Method 800 may be applicable to core 300 in FIG. 3, as well as to a multicore processor such as processor 200 in FIG. 2 or processor 700 in FIG. 7. Method 800 may also be applicable to a multi-processor system such as system 100 in FIG. 1. Referring collectively to FIG. 2, FIG. 3 and method 800 of FIG. 8, the method may begin in block 801.

Circuitry may monitor a given core (block 802). A core monitor, such as core monitor 335 in FIG. 3, may monitor instruction committing in the given core, such as core 2 210c for example, and may determine if a current instruction commits. In some embodiments, core 2 210c may be a multi-threaded core, in which case a core monitor for each thread execution unit may individually monitor committing of instructions for each respective thread.

The method may depend upon a status of the given core (block 803). Core monitor 335 may determine if the current instruction commits. If core 2 210c commits the current instruction, then the method may remain in block 803. Otherwise, if it is determined that core 2 210c is stuck, or that a thread execution unit of core 2 210c is stuck, then the method may indicate the stuck condition in block 804.

Core monitor 335 may send an indication to that core 2 210c is stuck (block 804). Core monitor 335 may assert a control signal to a supervisor unit, or core monitor 335 may set or clear a bit or bits in a status register to indicate the stuck condition. In some embodiments, the supervisor unit may correspond to another core in processor 200 (or in another processor in a system, such as system 100 of FIG. 1) executing a supervisory software thread. In such a case, the indication that core 2 210c is stuck may cause the supervisor core, core 7 210h, for example, to take an exception or software trap as well as may place core 7 210h into a privileged or hyper-privileged mode, thereby allowing core 7 210h to access memory and registers of core 2 210c. In other embodiments, a watchdog circuit, configured to monitor operation of a processor, may correspond to the supervisor unit.

The supervisor unit may disable stuck core 2 210c (block 805). The supervisor unit may access a configuration register of core 2 210c, which may include one or more register bits that enable and disable instruction execution in core 2 210c. The supervisor unit may disable core 2 210c, thereby halting the core from committing further instructions for one or more software threads assigned to core 2 210c. In some embodiments, core 2 210c may be allowed to commit one or more instructions to bring core 2 210c into a suitable state for halting.

The supervisor unit may select a core to replace core 2 210c (block 806). In some embodiments, a core may be reserved as a replacement core. Such a replacement core may be prevented, by an operating system, for example, from being assigned software threads during normal operation of a system. If the system includes a replacement core, then this replacement core may be selected. Otherwise, if a replacement core has not been assigned or if the replacement core has already been assigned to replace a different stuck core, then the supervisor unit may determine if a suitable replacement is available. In some embodiments, a suitable replacement may correspond to a core, which is currently idle. In a multi-threaded core processor, a suitable core may be a core with enough idle thread execution units for each thread assigned to the stuck core.

In other embodiments, a suitable core may correspond to a core running lower priority threads that may be halted to allow execution of higher priority stalled threads. In such an embodiment, the supervisor unit may track a priority of each thread assigned to each core the supervisor unit monitors. In the event a replacement core is needed and no idle cores are available, the supervisor unit may select the core assigned to the lowest priority threads and compare priorities to determine if the threads of stuck core 2 210c are higher than the priorities of the selected core. It is further known that multiple methods for comparing priorities of software threads exist, and other suitable methods may be used with method 800. In a processor with multi-threaded cores for example, it is contemplated that higher priority threads may be shuffled between cores to free a single core as the replacement. Another example may include assigning individual threads of stuck core 2 210c to more than one replacement core, in which each selected replacement core may have a limited number of execution units available for receiving a stuck thread.

Once a replacement core is identified, such as core 4 210e, for example, the supervisor unit may copy contents of memory and registers from stuck core 2 210c to core 4 210e (block 807). The supervisor unit may, in some embodiments, copy contents of memory and registers from core 2 210c directly to corresponding memory and registers in core 4 210e. In other embodiments, the supervisor unit may copy the contents of core 2 210c to a buffer memory before copying the contents to core 4 210e. If a buffer memory is used, then contents of core 2 210c may be copied at any time after core 2 210c has been disabled, and may therefore occur before the replacement core is selected.

Core 4 210e may resume processing of the software threads from stuck core 2 210c (block 808). In response to copying the contents of memory and registers of core 2 210c to corresponding memory and registers of core 4 210e, the supervisor unit may enable core 4 210e to resume processing of the software threads previously assigned to core 2 210c. By receiving the content of the stuck core's memory and registers, core 4 210e may be in substantially the same state as core 2 210c before conditions cased core 2 210c to become stuck. Core 4 210e may be capable of resuming processing of the software threads without having to restart processing from the beginning of the threads. The method may end in block 809.

It is noted that method 800 of FIG. 8 is merely an example. Variations of the disclosed method are possible. For example, different numbers and different orders of the presented blocks may be employed, and the contents of memory and registers of a stuck core may be copied into a buffer memory after block 805.

Figure 9:
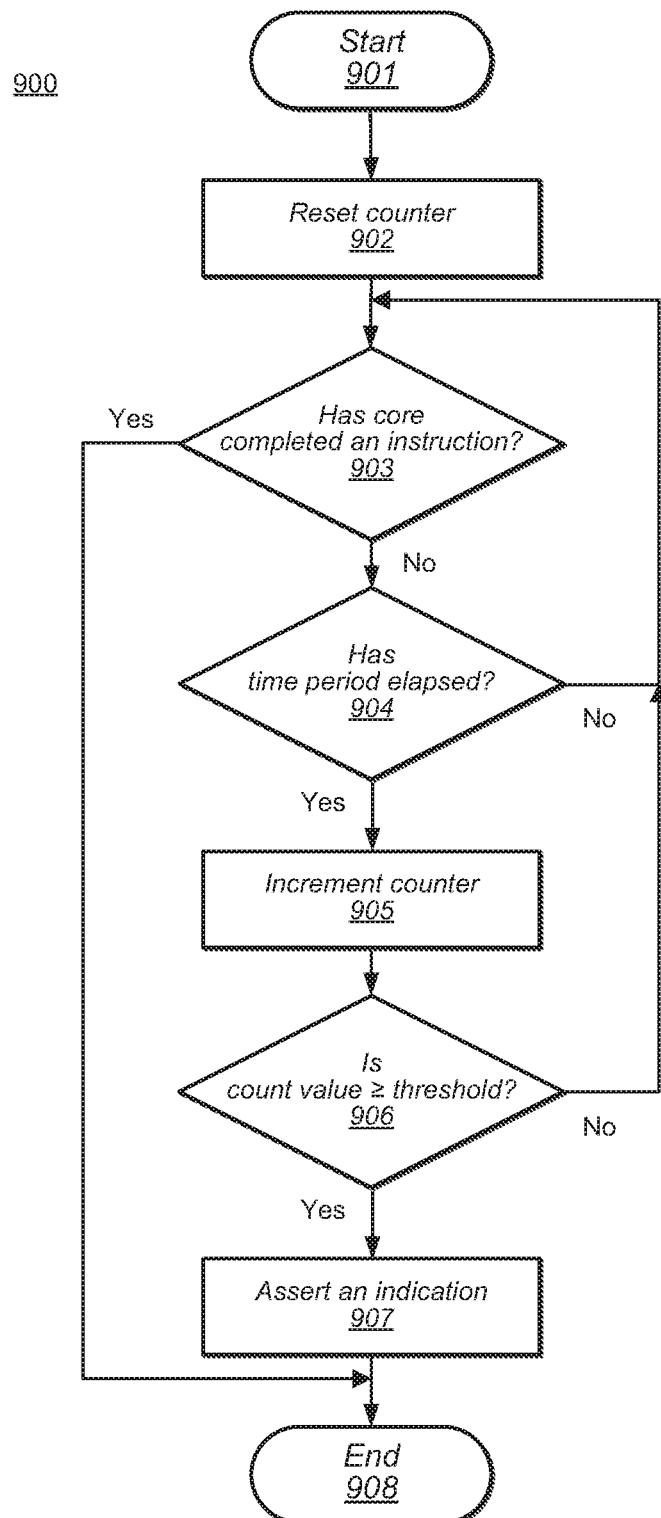
FIG. 9 depicts a flowchart illustrating an embodiment of method for determining if a processor core is stalled.

Moving to FIG. 9, a flowchart is presented illustrating an embodiment of method for determining if a core is stalled. Method 900 may be applicable to a core monitor, such as core monitor 335 of core 300 in FIG. 3. Referring collectively to FIG. 3 and method 900 of FIG. 9, the method may begin in block 901 with core 300 assigned at least one software thread for processing.

A count value in a counter circuit may be reset to a starting value (block 902). A core monitor, such as core monitor 335 in core 300, may include a counter circuit. The count value may be reset in response to an instruction having just committed in a core 300. Resetting the count value may correspond to setting the value to zero, while in other embodiments, the count value may be reset to a predetermined non-zero value.

The method may depend on committing an instruction of the software thread (block 903). Core monitor 335 may determine if corresponding execution unit 330 has committed an instruction. In some embodiments, instruction execution may be performed "in-order," i.e., executing an instruction may correspond to picking a next instruction from the end of an instruction queue, such as instruction cache 314, processing the instruction in execution unit 330, and writing results back to memory for use by subsequent instructions. In such embodiments, instructions are processed in the order in which they were placed in instruction cache 314 or specified in a software application.

In other embodiments, core 300 may be configured to perform out-of-order execution. A processor or processing core configured to perform Out-Of-Order (OOO) execution may execute instructions in a different order than an order specified in a software application. The order in which instructions are executed may, in various embodiments, be dependent upon an availability of data, i.e., operands, for a given instruction. For example, instructions whose data is available may be executed, while execution of instructions whose data is not available may be stalled until needed data is available. By allowing some instructions to proceed, the processor may perform useful work during cycles that would otherwise be spent waiting for operands to become available.

During an OOO operation, once an instruction has been executed, results of the instruction may then be stored in a results queue. A result of a younger instruction may remain in the results queue until older instructions have been executed, and their respective results written back to memory. When the results of older instructions have been written back to memory, the result of the younger instruction may then be written back to memory and the instruction may then be referred to as "retired" or "committed." If core monitor 335 detects an instruction has been committed or otherwise completed by core 300, then the method may end in block 908. Otherwise, the method may proceed to block 904.

The method may now depend on a state of a time period (block 904). The counter circuit in core monitor 335 may increment after a predetermined amount of time elapses. The predetermined amount of time may correspond to one or more cycles of a clock signal received by core 300. In other embodiments, other forms of delineating an amount of time may be used. The amount of time may be programmable or may be determined at a system boot time. The amount of time may also be the same for all core monitors in a processor or may be configurable for each core of a multi-core processor, such as processor 200 in FIG. 2. If the amount of time has not elapsed, then the method may return to block 903 to determine if an instruction has executed. Otherwise, the method may increment the counter circuit in block 905.

The count value of the counter circuit may be incremented (block 905). The count value may be incremented by one or any other suitable value. In some embodiments, the count value may be decremented by a suitable value rather than incremented if the counter circuit is configured to count down, rather than up.

The method may now depend on the count value of the counter circuit (block 906). Core monitor 335 may determine if the count value has reached or surpassed a threshold value. This threshold value may be configured at a system boot time or may be dynamically programmable. In some embodiments, the threshold value may be programmable or configurable independently for each core or each execution unit in a core. In other embodiments, one threshold value may be set for all execution units. If the count value has not reached the threshold value, then the method may determine if an instruction has been executed in block 903. Otherwise the method may assert an indication in block 907.

Core monitor 335 may assert an indication that the respective execution unit 330 is stalled (block 907). If the count value in the counter circuit reaches the threshold value without the respective execution unit 330 may be considered stalled or hung. Core monitor 335 may assert an indication by asserting a control signal to a supervisor unit (or another core executing a supervisor thread). In other embodiments, core monitor 335 may set or clear one or more register bits of an error status register. The indication may cause the supervisor unit to enter a privileged or hyper-privileged mode in which to process the core 300 with a stalled execution unit 330.

Method 900 of FIG. 9 is merely an example. In other embodiments, different operations and different numbers of operations are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus, comprising:
a set of multi-threaded cores including a first core that is configured to:
process instructions from a plurality of threads;
a monitor circuit coupled to the first core, wherein the monitor circuit is configured to:
detect that processing, by the first core, of a first thread of the plurality of threads has entered a stuck state; and
set a bit in a status register that causes a second core to enter a privileged mode; and
wherein the second core is configured to:
after entering the privileged mode, disable the first core from further processing instructions of the first thread;

identify a third core of the set of multi-threaded cores that has an idle thread execution unit;
copy data associated with the first thread from the first core to the third core; and
cause the third core to process instructions of the first thread.

2. The apparatus of claim 1, wherein the first core is further configured to process instructions of a second thread while the first thread is stuck; and
wherein the second core is further configured to, in response to a determination that the bit is set, disable the first core from further processing instructions of the second thread.

3. The apparatus of claim 2, wherein the second core is further configured to copy data associated with the second thread from the first core to the third core; and
wherein the third core is further configured to process instructions of the second thread.

4. The apparatus of claim 2, wherein to disable the first core from further processing instructions of the second thread, the second core is configured to allow the first core to commit one or more instructions to bring the second thread into a state for copying.

5. The apparatus of claim 1, wherein to cause the second core to enter the privileged mode, the bit in the status register is configured to trigger an exception when set.

6. The apparatus of claim 1, wherein the third core is further configured to continue processing a different thread while executing the first thread.

7. The apparatus of claim 1, wherein the second core is further configured to:
process a plurality of threads, including a supervisor thread; and
use the supervisor thread to read the status register.

8. A method, comprising:
executing a first thread by a first core of a set of multi-threaded cores;
executing a supervisor thread by a second core of the set of multi-threaded cores;
in response to determining that the first core has stopped executing the first thread, setting, by a monitoring circuit, a bit in a status register that causes the second core to enter a privileged mode;
in response to the setting, halting, by the second core, the first core from further execution of the first thread;
in response to determining that a third core of the set of multi-threaded cores has an idle thread execution unit, copying data associated with the first thread from the first core to the third core; and
in response to the copying, executing, by the third core, the first thread.

9. The method of claim 8, further comprising:
continuing, by the first core, execution of a second thread after execution of the first thread halted; and
in response to the setting, disabling, by the second core, the first core from further executing the second thread.

10. The method of claim 9, further comprising:
copying, by the second core, data associated with the second thread from the first core to the third core; and
executing, by the third core, the second thread.

11. The method of claim 9, further comprising allowing the first core to commit one or more instructions of the second thread to bring the second thread into a state for copying.

12. The method of claim 8, further comprising continuing to process, by the third core, a different thread while executing the first thread.

13. The method of claim 8, further comprising:
executing, by the second core, a plurality of threads, including the supervisor thread; and
detecting, by the second core, the setting of the bit in the status register using the supervisor thread.

14. A system, comprising:
a first set of multi-threaded cores including a first core and a first designated core;
a second, different set of multi-threaded cores including a second core and a second designated core;
a first monitor circuit coupled to the first core, wherein the first monitor circuit is configured to:
detect that the first core has stalled processing of a first thread of a first plurality of threads being processed in the first core; and
set a first bit in a first status register that causes the second designated core to enter a privileged mode; and
a second monitor circuit coupled to the second core, wherein the second monitor circuit is configured to:
detect that the second core has stalled processing of a second thread of a second plurality of threads being processed in the second core; and
set a second bit in a second status register that causes the first designated core to enter the privileged mode;
wherein the first designated core is configured, after entering the privileged mode, to disable the second core from further processing instructions of the second thread; and
wherein the second designated core is configured, after entering the privileged mode, to disable the first core from further processing instructions of the first thread.

15. The system of claim 14, wherein the second designated core is configured to:
in response to a determination that the first bit is set, halt the first core from further processing of the first thread; and
in response to a determination that a third core, included in the first set of multi-threaded cores, has an idle thread execution unit, copy data associated with the first thread from the first core to the third core.

16. The system of claim 15, wherein the second designated core is further configured to:
in response to the determination that the first bit is set, halt the first core from further processing a third thread that is not stalled; and
copy data associated with the third thread from the first core to the third core.

17. The system of claim 16, wherein the third core is configured to, in response to an indication from the second designated core:
process the first and third threads; and
resume processing of a fourth thread that was being processed by the third core prior to the setting of the first bit.

18. The system of claim 14, wherein the first designated core is further configured to select a fourth core from the second set of multi-threaded cores.

19. The system of claim 18, wherein the first designated core is further configured to copy, using the privileged mode, data associated with the second thread from the second core to the fourth core.

20. The system of claim 14, wherein the first and second designated cores are configured to process respective supervisor threads using the privileged mode.

* * * * *

UNITED STATES PATENT AND TRADEMARK OFFICE
CERTIFICATE OF CORRECTION

PATENT NO. : 11,709,742 B2
APPLICATION NO. : 17/648443
DATED : July 25, 2023
INVENTOR(S) : Lewis et al.

It is certified that error appears in the above-identified patent and that said Letters Patent is hereby corrected as shown below:

On the Title Page

Item (57), Column 2, under Abstract, Line 5, delete "may be may be" and insert -- may be --, therefor.

In the Specification

In Column 10, Line 18, delete "ALU340." and insert -- ALU 340. --, therefor.

In Column 16, Line 11, delete "and or" and insert -- and/or --, therefor.

Signed and Sealed this
Twenty-eighth Day of May, 2024

Katherine Kelly Vidal
*Director of the United States Patent and Trademark Office*